US006405433B1

(12) United States Patent
Laforest

(10) Patent No.: US 6,405,433 B1
(45) Date of Patent: Jun. 18, 2002

(54) METHOD OF REMOVING A LINER OF A PISTON CYLINDER

(76) Inventor: Alain Laforest, P.O. Box 1376, Athabasca, Alberta (CA), T9S 2B2

( * ) Notice: Subject to any disclaimer, the term of this patent is extended or adjusted under 35 U.S.C. 154(b) by 0 days.

(21) Appl. No.: 09/687,054

(22) Filed: Oct. 12, 2000

(30) Foreign Application Priority Data

Mar. 10, 2000 (CA) ............................................ 2300619

(51) Int. Cl.[7] ................................................ B23P 15/00

(52) U.S. Cl. ............................ 29/888.061; 29/888.011; 29/402.03

(58) Field of Search ..................... 29/888.061, 888.011, 29/888.01, 402.03, 426.4, 426.5, 426.6

(56) References Cited

U.S. PATENT DOCUMENTS 3,156,373 A * 11/1964 Willis
3,986,383 A * 10/1976 Petteys ........................ 29/263
4,445,716 A 5/1984 Hoffman ...................... 285/55
4,530,141 A 7/1985 Vachon ...................... 29/156.4
4,589,180 A * 5/1986 Vachon .................. 29/888.011
5,222,295 A 6/1993 Dorris, Jr. .............. 29/888.011
5,784,783 A 7/1998 Carpenter .............. 29/888.011

* cited by examiner

*Primary Examiner*—I Cuda Rosenbaum
(74) *Attorney, Agent, or Firm*—Christensen O'Connor Johnson Kindness PLLC

(57) ABSTRACT

A method of removing a liner of a piston cylinder which includes the following steps. A first step involves positioning an expandable force exerting device, such as an hydraulic cylinder, within the piston cylinder. A second step involves affixing a contact member transversely across the liner. A third step involves expanding the force exerting device to exert a force upon the contact member to push the liner from the piston cylinder.

8 Claims, 8 Drawing Sheets

METHOD OF REMOVING A LINER OF A PISTON CYLINDER

FIELD OF THE INVENTION

The present invention relates to a method of removing a liner of a piston cylinder.

BACKGROUND OF THE INVENTION

The piston cylinder of every large engine, pump or compressor is lined by a liner. Maintenance personnel sometimes must remove this liner during servicing. Problems arise when the liner becomes stuck. Maintenance personnel exert whatever force can be brought to bear in the field to remove the liner. If the liner cannot be dislodged, the engine, pump or compressor must be transported to a machine shop and metal boring equipment used to machine the liner out of the piston cylinder.

When working in the field, maintenance personnel have limited options available for exerting a force to dislodge the liner. It is not unusual for a chain to be attached to the liner and extended to the bumper of a service vehicle. A pulling force is then exerted by driving the service vehicle ahead slowly. There is an inherent danger in this method, should the chain break. It is also not unusual for a cooling fluid to be directed at the liner, in the hope and expectation that the liner will contract when cooled. There is an inherent danger in using a cooling fluid, as many readily available cooling fluids, such as propane, are flammable or explosive.

SUMMARY OF THE INVENTION

What is required is an alternative method of removing a liner of a piston cylinder.

According to the present invention there is provided a method of removing a liner of a piston cylinder which includes the following steps. A first step involves positioning an expandable force exerting device, such as an hydraulic cylinder, within the piston cylinder. A second step involves affixing a contact member transversely across the liner. A third step involves expanding the force exerting device to exert a force upon the contact member to push the liner from the piston cylinder.

The method, as described above, has proven to be comparatively fast, safe and effective. Depending upon the amount of force required, an hydraulic cylinder of an appropriate size can be obtained. Through this method a force of many tons can be exerted to dislodge the liner.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

The preferred method of removing a liner of a piston cylinder will now be described with reference to FIGS. 1 through 8.

Figure 1:
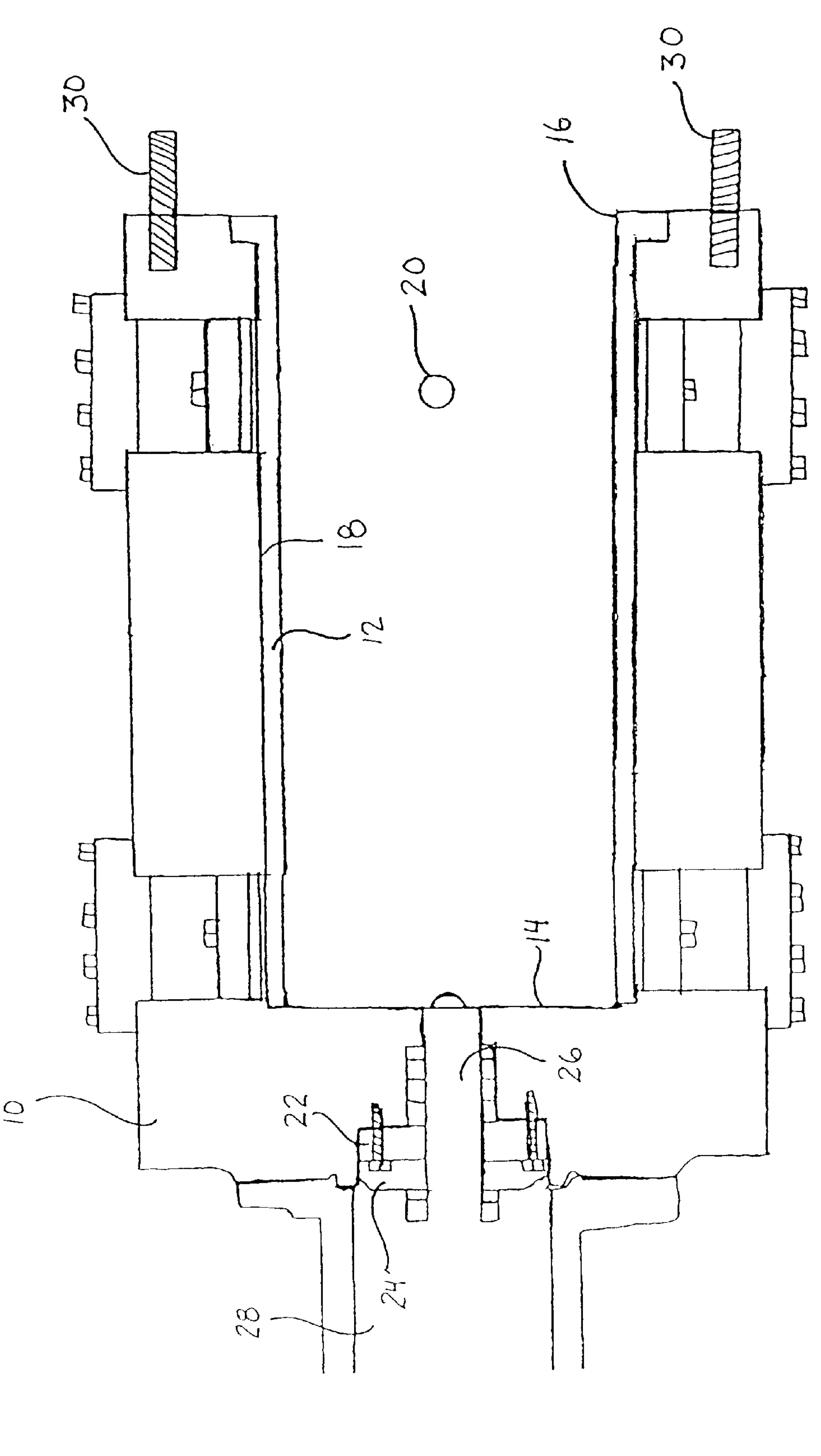
FIGURE 1 PRIOR ART
FIG. 1 labelled as PRIOR ART is a side elevation view of a piston cylinder having a liner.

Referring to FIG. 1, there is illustrated a piston cylinder 10 having a liner 12. Piston cylinder 10 has a first end 14, a second end 16, and an inner sidewall 18. Inner sidewall 18 of piston cylinder 10 has two head opening radial ports with each radial ports 20 being located on opposite sides of inner sidewall 18. Liner 12 fits tightly along inner sidewall 18 and also has radial ports 20 which are identical in size and positioning to radial ports 20 on inner sidewall 18. A packing box 22 and a false head 24 are engaged at first end 14 of piston cylinder 10. A channel 26 traverses from first end 14 of piston cylinder 10 through packing box 22 and false head 24 into a cross head guide 28. Second end 16 of piston cylinder 10 is open with studs 30 located external to and adjacent to second end 16 of piston cylinder 10.

Figure 2:
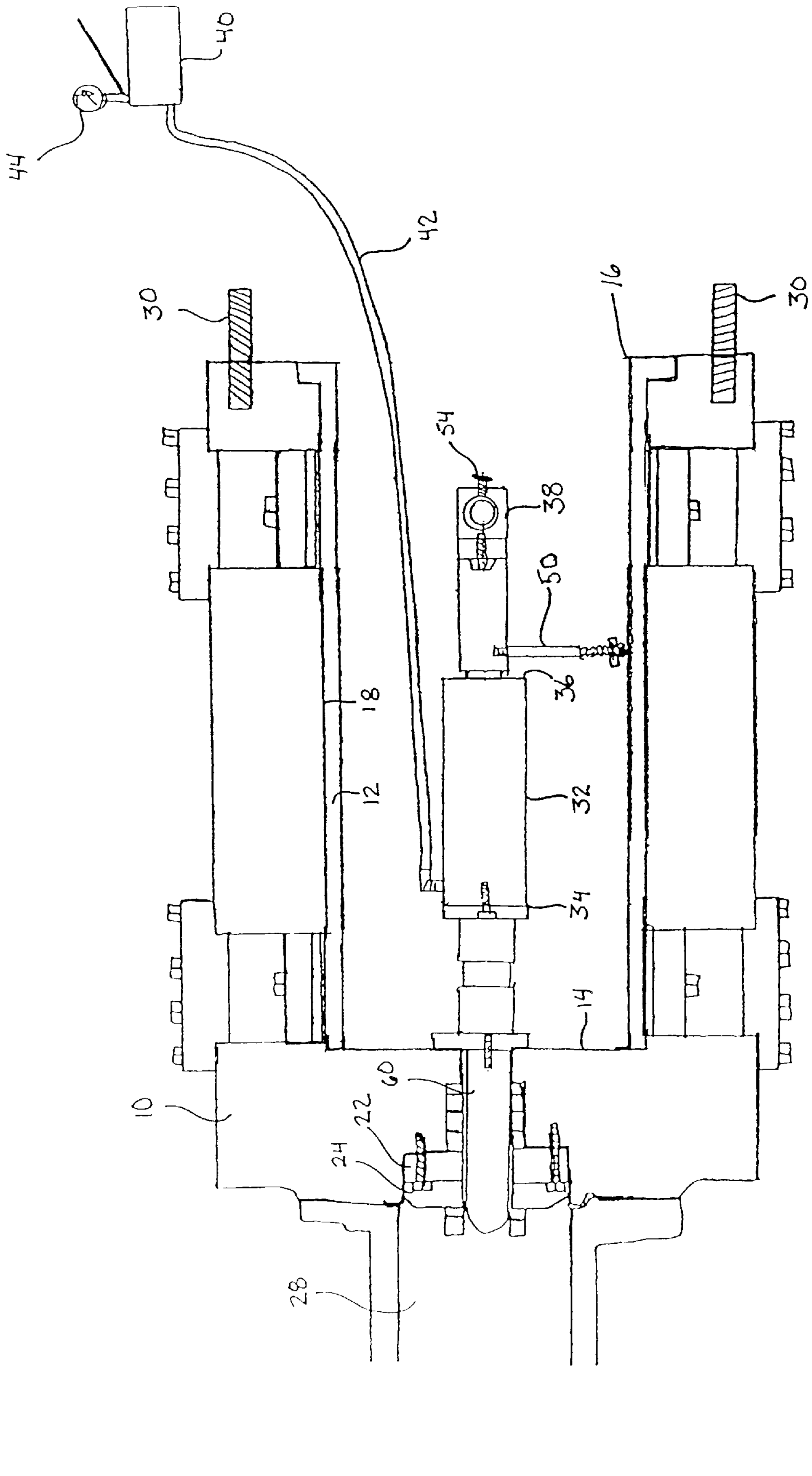
FIG. 2 is a first side elevation view of the piston cylinder illustrated in FIG. 1, with an expandable force exerting device positioned within the piston cylinder and a contact member positioned transversely across the liner.
Figure 5:
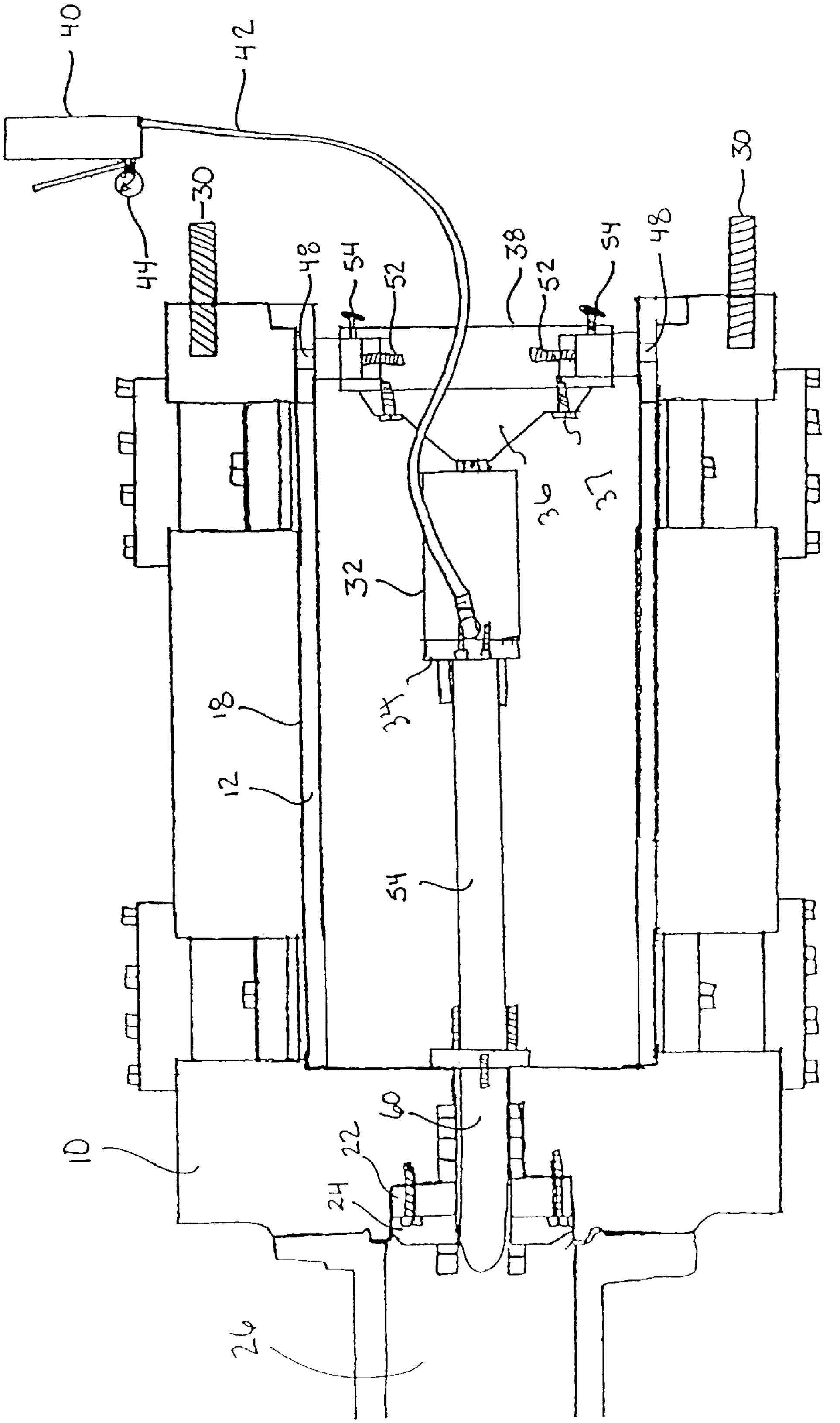
FIG. 5 is a second top plan view of the piston cylinder illustrated in FIG. 3.

The method of removing liner 12 consists of the following steps. Referring to FIG. 2, the first step is to position an expandable hydraulic cylinder 32 as a force exerting device within piston cylinder 10. Hydraulic cylinder 32 has a first end 34 and a second end 36. First end 34 of hydraulic cylinder 32 is positioned at first end 14 of piston cylinder 10. Second end 36 of hydraulic cylinder 32 is secured to a contact member 38. A hydraulic pump 40 located outside of piston cylinder 10. Hydraulic pump 40 supplies power to hydraulic cylinder 32 though a conduit 42 which extends from hydraulic pump 40 to hydraulic cylinder 32. Hydraulic pump 40 has a pressure gauge 44 with which to monitor pressure. Referring to FIG. 5, when piston cylinder 10 is longer than hydraulic cylinder 32 (which will usually be the case), a spacer member 54 is used to adapt to the required length. Spacer member 54 must be inserted BEFORE the insertion of hydraulic cylinder 32. A first end 56 of spacer member 54 is inserted into tool adapter 60 positioned in channel 26, while the second end 58 is braced against first end 34 of hydraulic cylinder 32.

Figure 3:
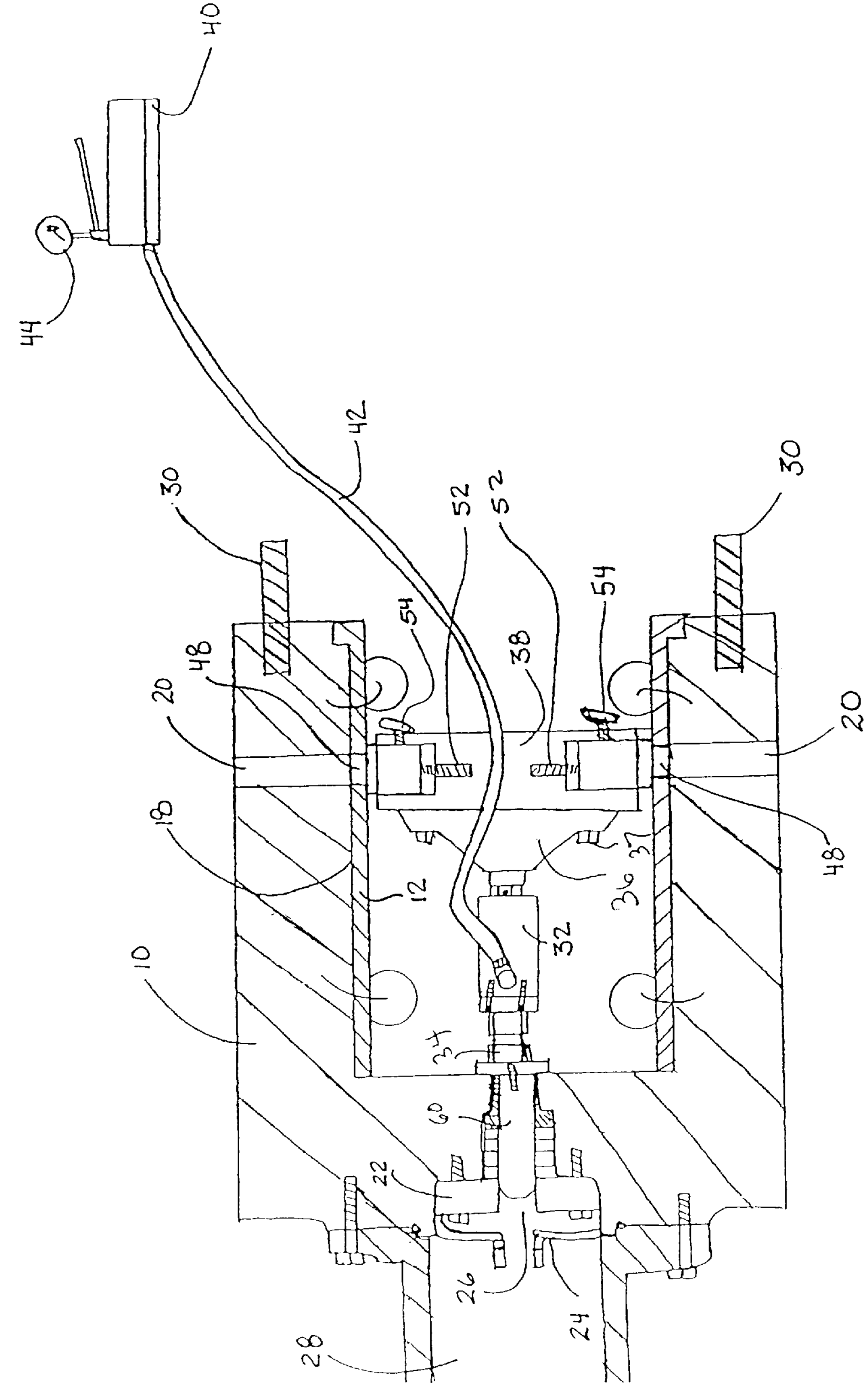
FIG. 3 is a top plan view of the piston cylinder illustrated in FIG. 2.
Figure 4:
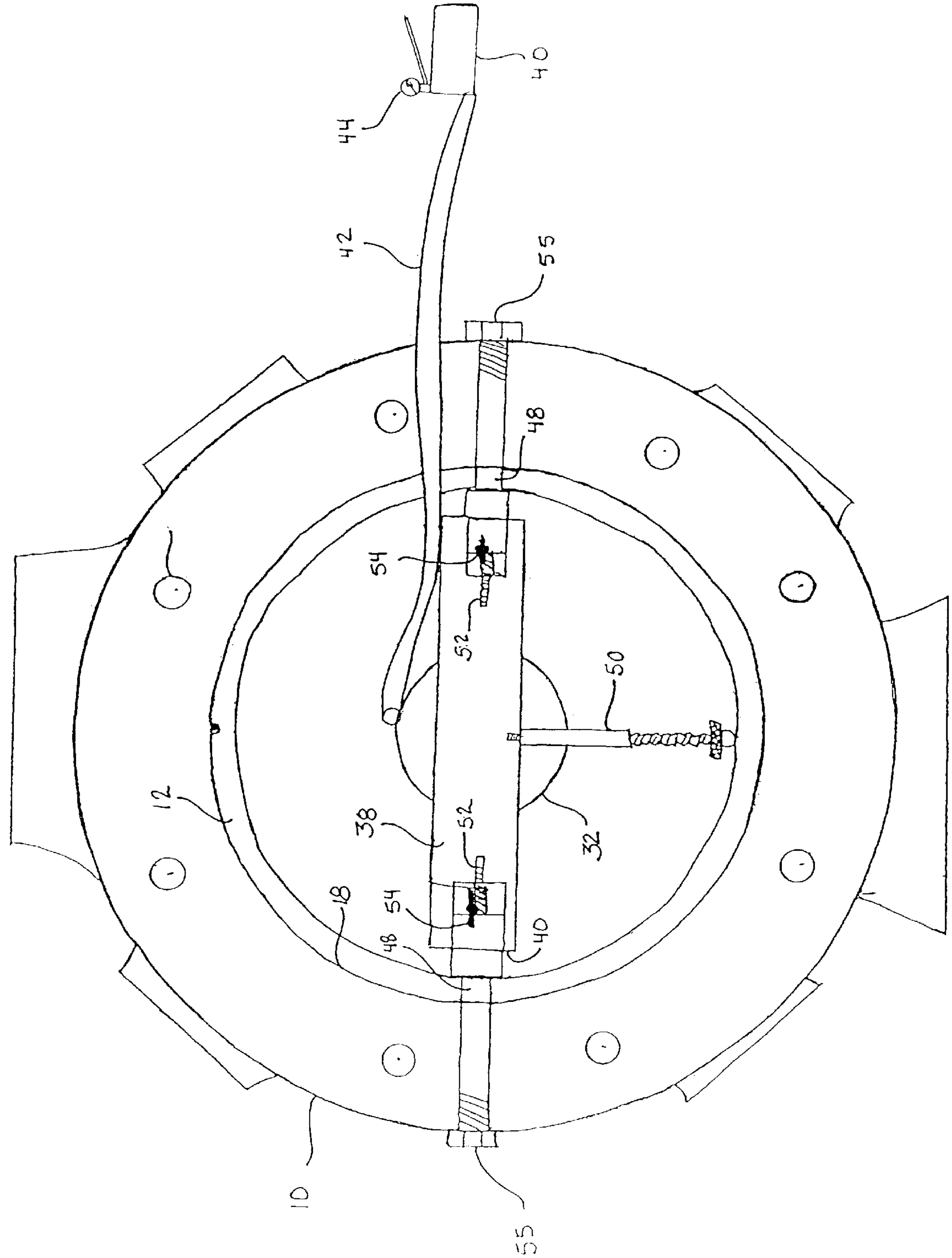
FIG. 4 is an end elevation view of the piston cylinder illustrated in FIG. 2.

Referring to FIGS. 3 and 4, the second step involves affixing contact member 38 transversely across liner 12 by engaging spring loaded pins 48 in radial ports 20. Contact member 38 has opposed ends 46 with spring loaded pins 48. Spring loaded pins 48 are engaged in radial ports 20 by springs 52 which push spring loaded pins 48 into radial ports 20. Activation of each spring 62 is controlled by turning of wingnut 64. Referring to FIG. 3, it is preferred that second end 36 of hydraulic cylinder 32 be secured by bolts 37 to contact member 38. Referring to FIG. 4, it is preferred that a radial alignment member 50 is secured to contact member 38 to prevent lateral movement.

Figure 6:
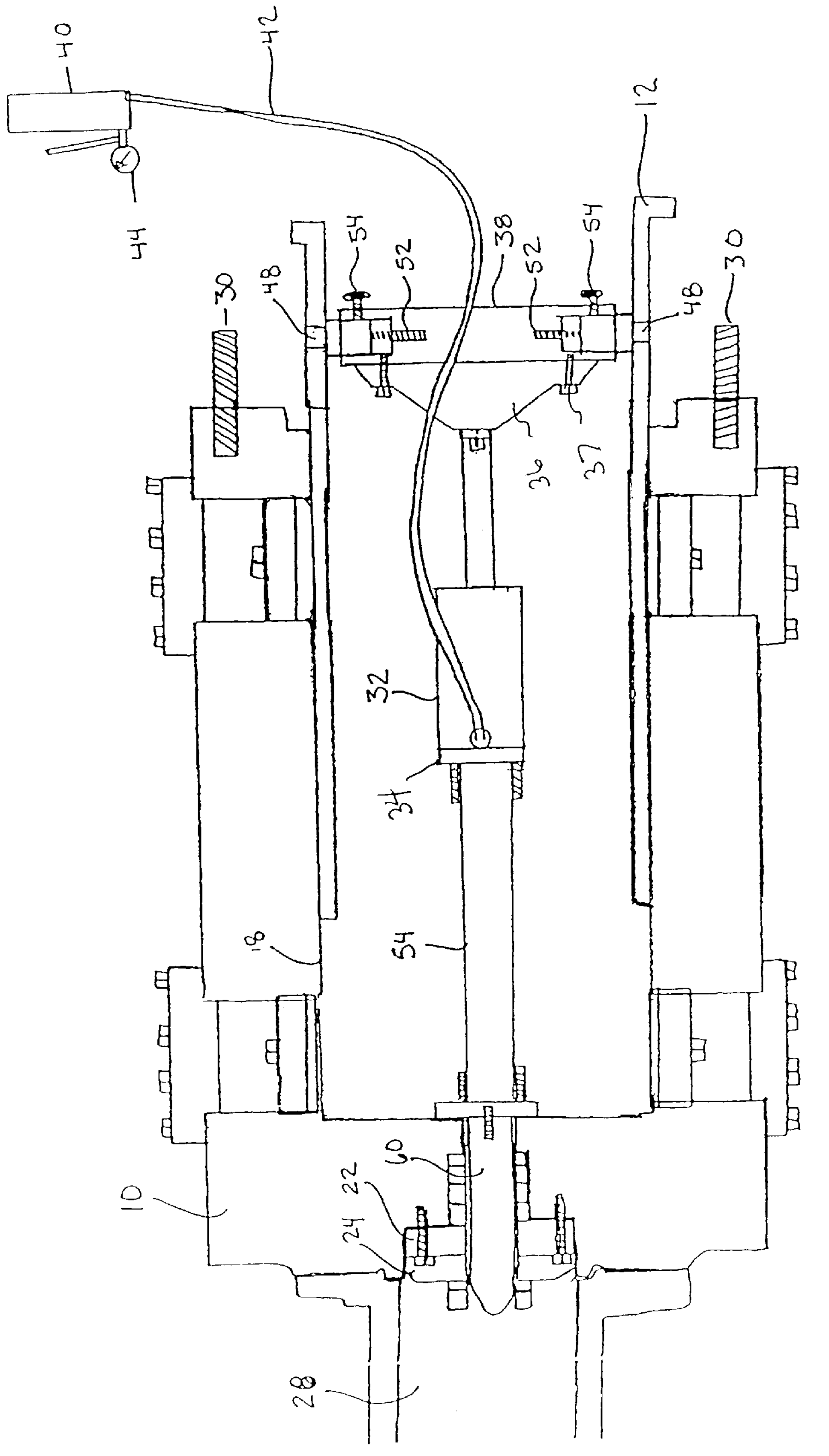
FIG. 6 is a third top plan view of the piston cylinder illustrated in FIG. 3.

Thirdly, hydraulic cylinder 32 is then extended to push liner 12 out of piston cylinder 10 as illustrated in FIG. 6. When hydraulic cylinder 32 is fully extended, pressure is released until hydraulic cylinder 32 retracts.

Figure 7:
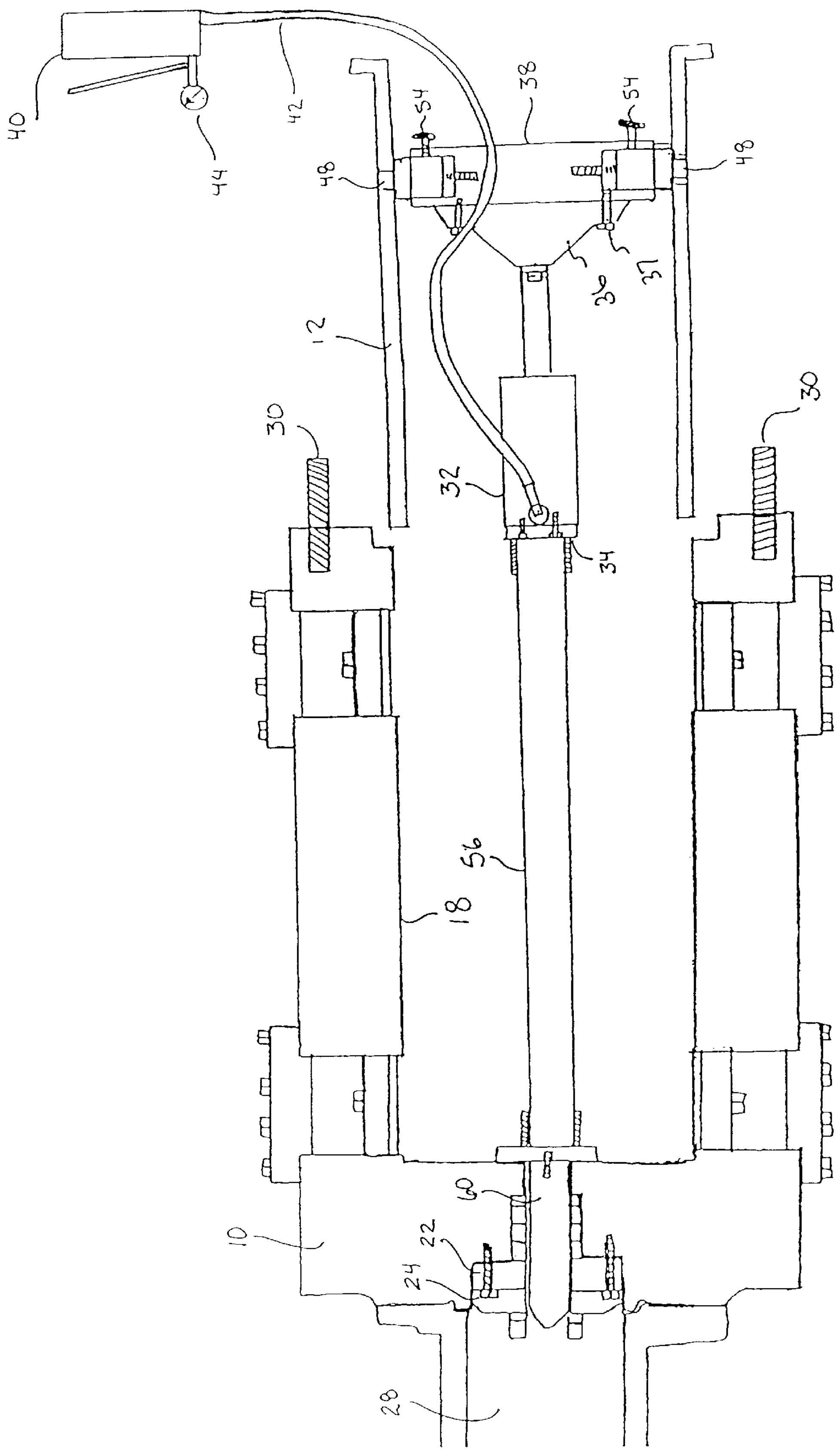
FIG. 7 is a fourth top plan view of the piston cylinder illustrated in FIG. 3.

As illustrated in FIG. 7, contact member 38, hydraulic cylinder 32 and spacer member 54 are then removed. A longer spacer member 56 is placed in position with tool adapter 60 inserted into channel 26 and hydraulic cylinder 32 and contact member 38 are repositioned. Hydraulic cylinder 32 is expanded again in order to further push liner

Figure 8:
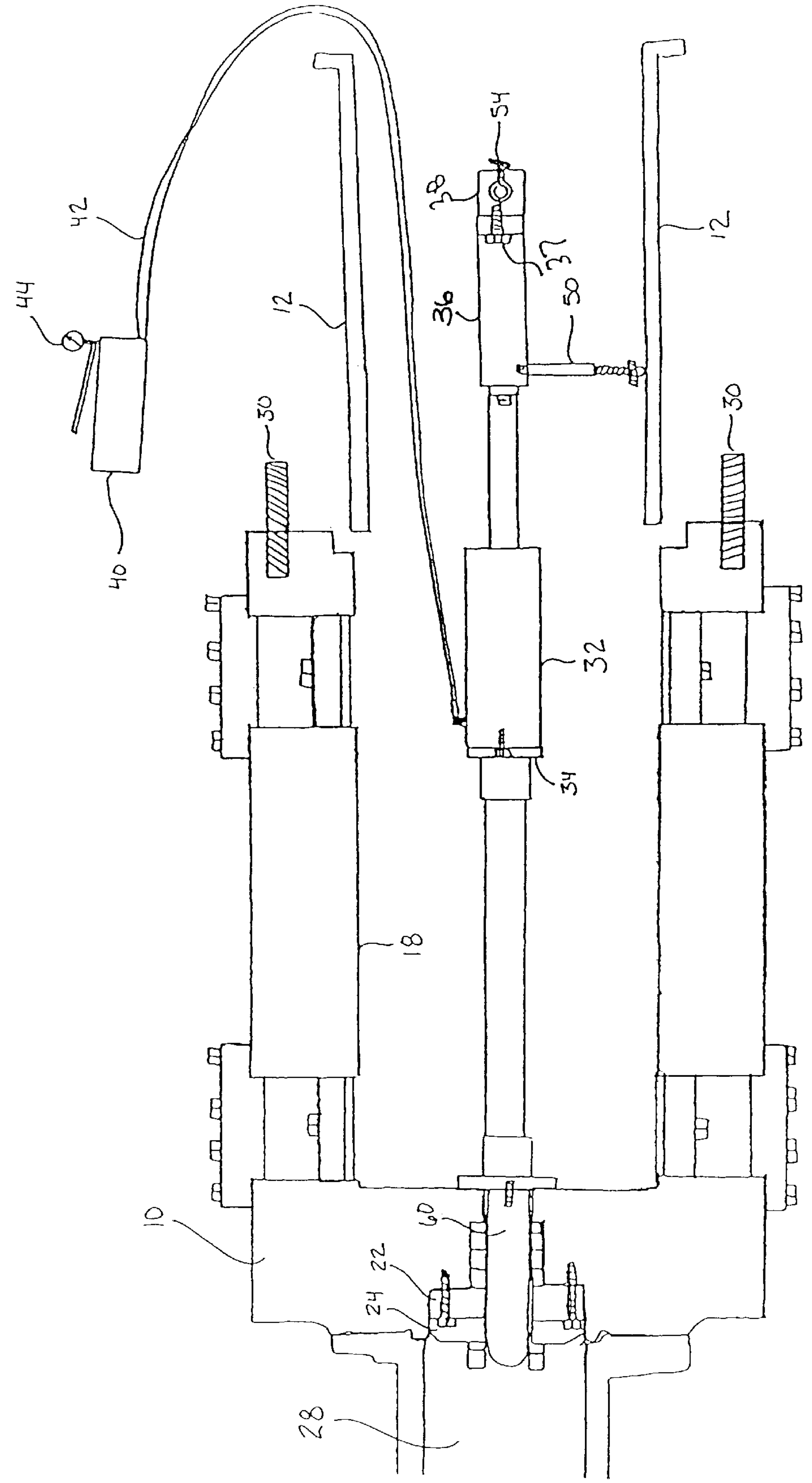
FIG. 8 is a side elevation view of the piston cylinder illustrated in FIG. 7.
Figure 3:
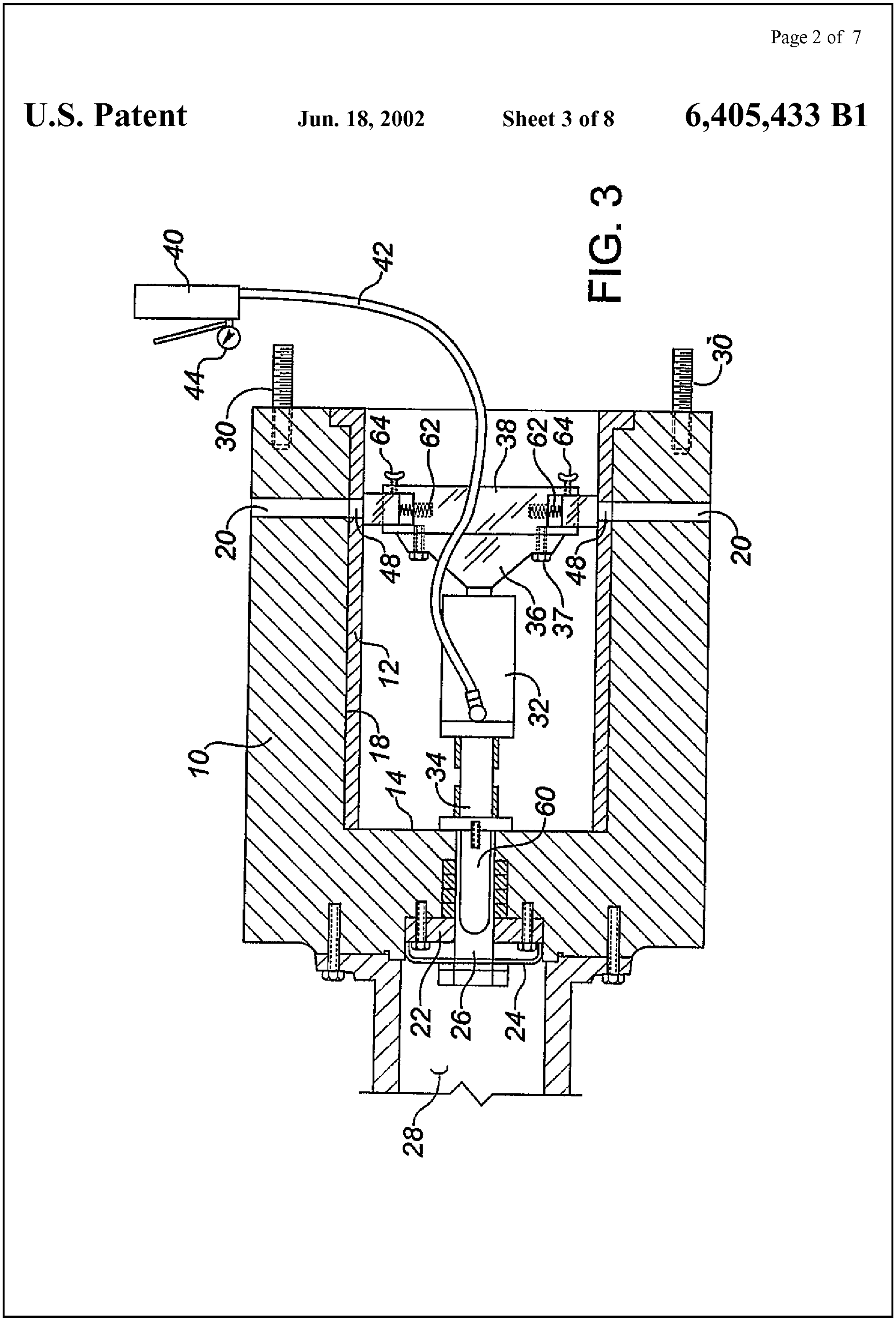
Figure 4:
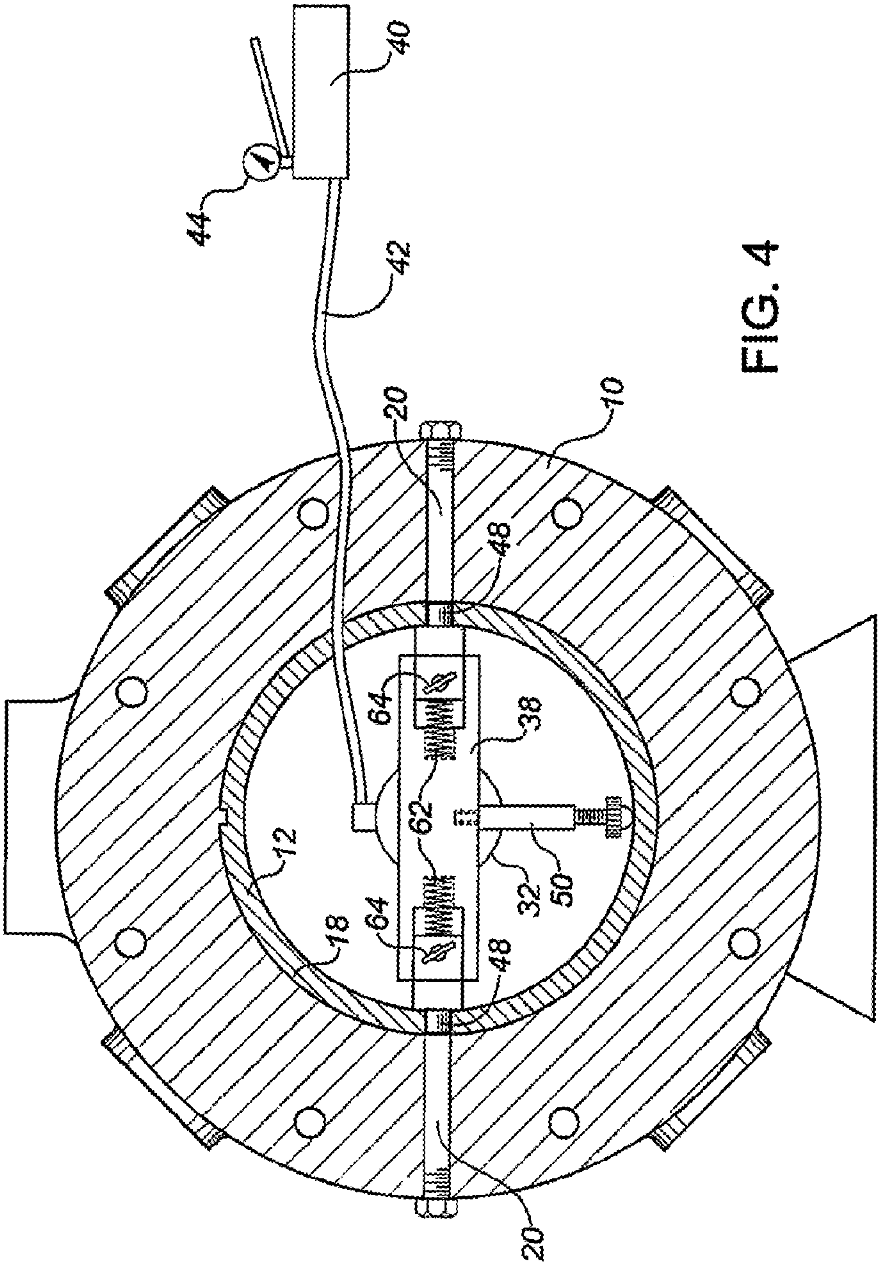
Figure 5:
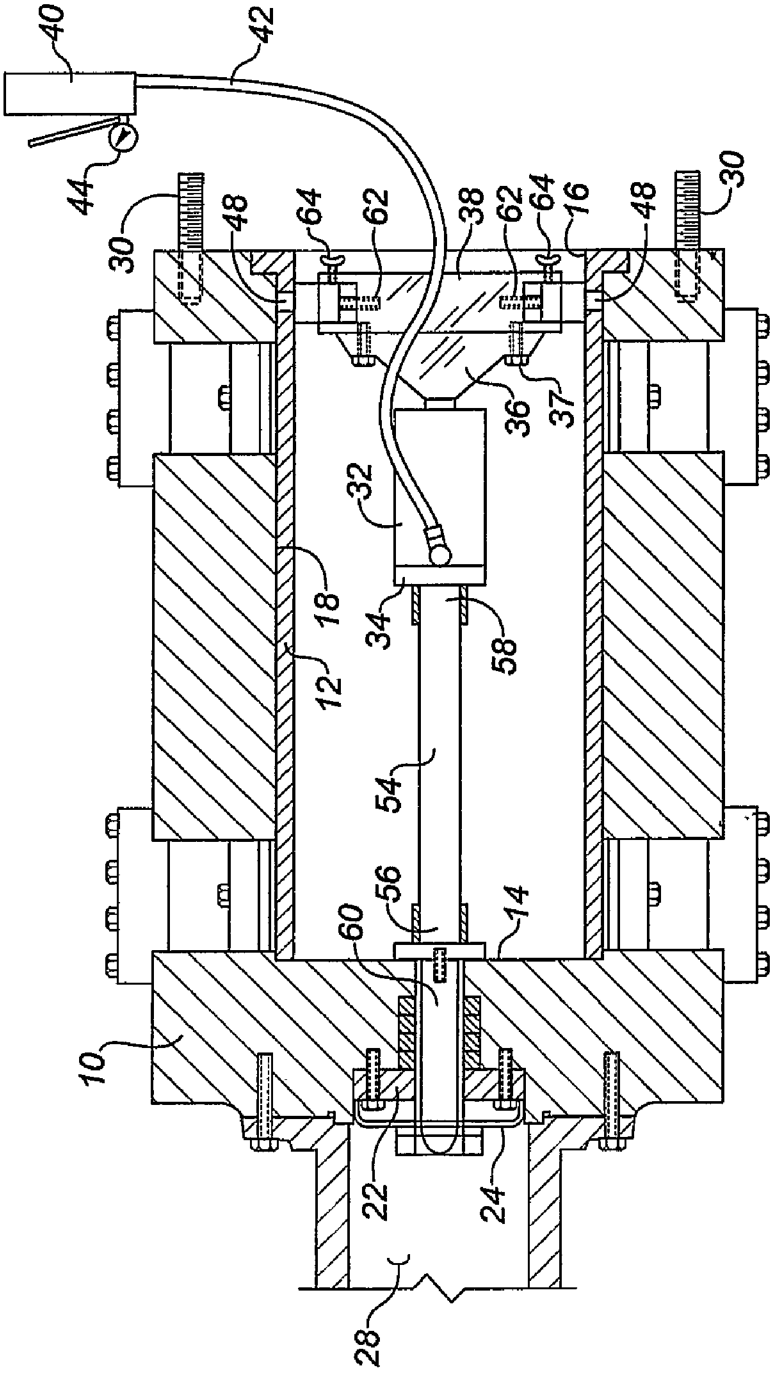
Figure 6:
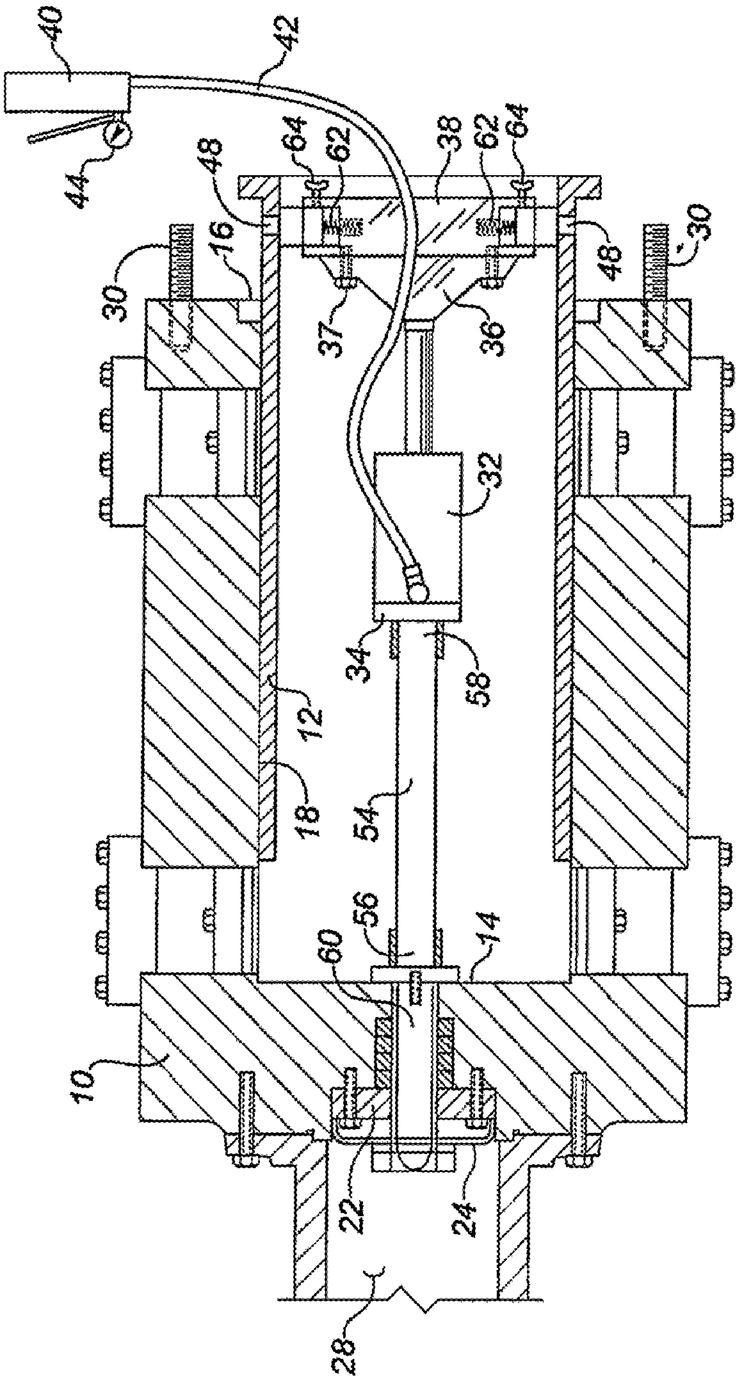
Figure 7:
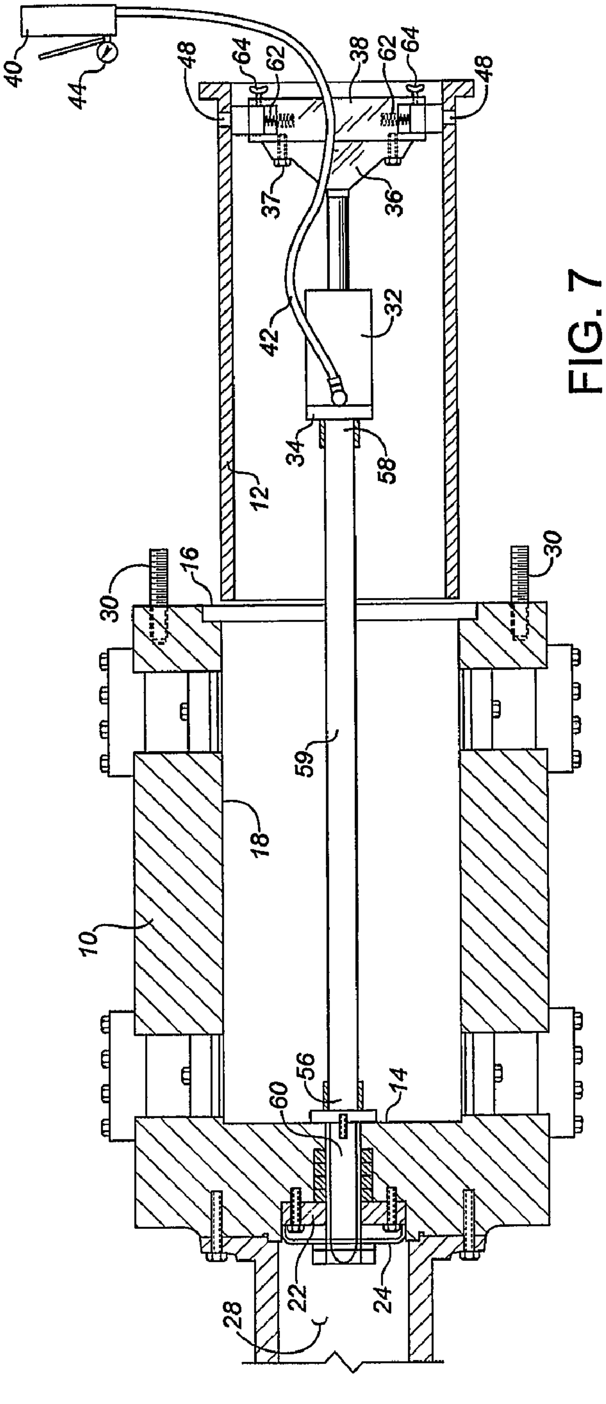
Figure 8:
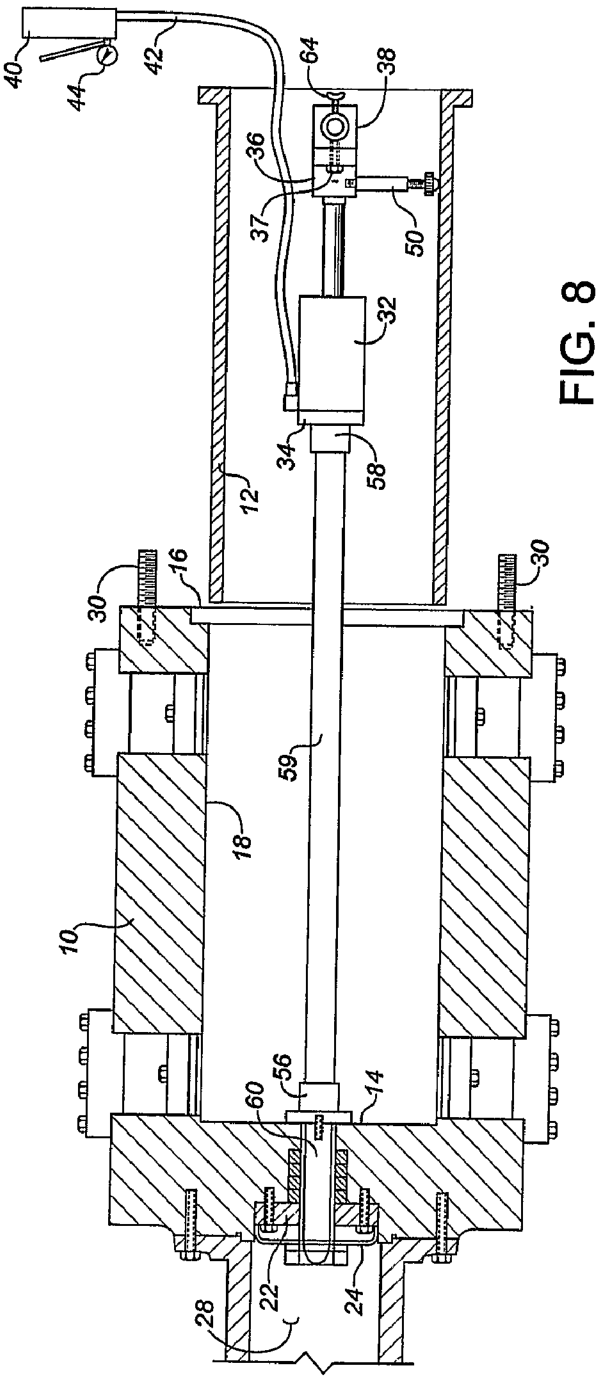

12 out of piston cylinder 10. Depending on the length of piston cylinder 10, subsequently longer spacer members may be substituted for spacer members 54 and 59, and the preceding steps repeated until liner 12 has been completely pushed outside of piston cylinder 10 as illustrated in FIG. 8.

It will be apparent to one skilled in the art that the method, as described above, provides a safer, more controlled and more effective manner of removing liner 12 from piston cylinder 10. Although tool adaptor 60 is illustrated as a male member which is inserted in channel 26, it will be apparent to one skilled in the art that the form of tool adaptor is not important and can vary. It will also be apparent that the form of spacer member and its manner of attachment can vary. It will finally be apparent to one skilled in the art that other modifications may be made to the illustrated embodiment without departing from the spirit and scope of the invention as hereinafter defined in the claims.

The embodiments of the invention in which an exclusive property or privilege is claimed are defined as follows:

1. A method of removing a liner of a piston cylinder, comprising the steps of:

positioning an expandable hydraulic cylinder as a force exerting device within the piston cylinder, the hydraulic cylinder having a first end and a second end;

positioning the first end of the hydraulic cylinder to a remote end of the piston cylinder;

securing the second end of the hydraulic cylinder to a contact member having opposed ends with spring loaded pins;

affixing the contact member transversely across the liner by engaging the spring loaded pins in radial ports in the liner; and expanding the hydraulic cylinder to exert a force upon the contact member to push the liner from the piston cylinder.

2. The method as defined in claim 1, a radial alignment member being secured to the contact member to prevent lateral movement.

3. The method as defined in claim 1, a spacer member being used to adapt the expandable hydraulic cylinder to accommodate the length of the piston cylinder.

4. A method of removing a liner of a piston cylinder, comprising the steps of:

positioning an expandable force exerting device within the piston cylinder;

affixing a contact member transversely across the liner; and expanding the force exerting device to exert a force upon the contact member to push the liner from the piston cylinder.

5. The method as defined in claim 4, the force exerting device having a first end positioned against a remote end of the piston cylinder and a second end secured to the contact member.

6. The method as defined in claim 4, the contact member having opposed ends with spring loaded pins that engage radial ports in the liner.

7. The method as defined in claim 4, a radial alignment member being secured to the contact member to prevent lateral movement.

8. The method as defined in claim 4, a spacer member being used to adapt the expandable force exerting device to accommodate the length of the piston cylinder.

* * * * *

UNITED STATES PATENT AND TRADEMARK OFFICE
CERTIFICATE OF CORRECTION

PATENT NO. : 6,405,433 B1
DATED : June 18, 2002
INVENTOR(S) : A. Laforest

It is certified that error appears in the above-identified patent and that said Letters Patent is hereby corrected as shown below:

Column 2,
Line 64, "spacer member 56" should read -- spacer member 59 --

Signed and Sealed this

Twenty-third Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,405,433 B1
APPLICATION NO. : 09/687054
DATED : June 18, 2002
INVENTOR(S) : Alain Laforest It is certified that error appears in the above-identified patent and that said Letters Patent is hereby corrected as shown below:

| COLUMN | LINE | ERROR |
|---|---|---|
| pp. 2-9 | Figs. 1-8 | Delete the informal drawings as issued with the Letters Patent and replace them with the formal drawings as officially entered into the application on May 7, 2002. |

Signed and Sealed this

Twenty-third Day of October, 2007

JON W. DUDAS
*Director of the United States Patent and Trademark Office*